United States Patent
Rowlands et al.

(10) Patent No.: US 12,555,011 B2
(45) Date of Patent: Feb. 17, 2026

(54) SUPERCONDUCTING RESERVOIR COMPUTER WITH JOSEPHSON TRANSMISSION LINES

(71) Applicant: RTX BBN Technologies, Inc., Cambridge, MA (US)

(72) Inventors: Graham Earle Rowlands, Arlington, MA (US); Thomas Akira Ohki, Arlington, MA (US); Guilhem Jean Antoine Ribeill, Arlington, MA (US); Minh-Hai Nguyen, Arlington, MA (US); Andrew Phillips Wagner, Brighton, MA (US)

(73) Assignee: RTX BBN TECHNOLOGIES, INC., Cambridge, MA (US)

(*) Notice: Subject to any disclaimer, the term of this patent is extended or adjusted under 35 U.S.C. 154(b) by 1238 days.

(21) Appl. No.: 17/365,870

(22) Filed: Jul. 1, 2021

(65) Prior Publication Data
US 2022/0012623 A1    Jan. 13, 2022

Related U.S. Application Data

(60) Provisional application No. 63/051,278, filed on Jul. 13, 2020.

(51) Int. Cl.
*G06N 10/00* (2022.01)
*H01B 12/02* (2006.01)
*H10N 60/12* (2023.01)

(52) U.S. Cl.
CPC .............. *G06N 10/00* (2019.01); *H01B 12/02* (2013.01); *H10N 60/12* (2023.02)

(58) Field of Classification Search
CPC .............................. G06N 10/00; H10N 60/12
See application file for complete search history.

(56) References Cited

U.S. PATENT DOCUMENTS

| 8,571,614 | B1 | 10/2013 | Mukhanov et al. |
| 2003/0039138 | A1 | 2/2003 | Herr |
| 2015/0092465 | A1 | 4/2015 | Herr et al. |
| 2017/0212860 | A1 | 7/2017 | Naaman et al. |
| 2018/0337322 | A1* | 11/2018 | Brink ............... H10N 60/82 |

(Continued)

FOREIGN PATENT DOCUMENTS

| JP | 2020087189 A | 6/2020 |
| WO | WO 2021/047891 A1 | 3/2021 |

OTHER PUBLICATIONS

Rowlands, et al. Reservoir Computing with Superconducting Electronics, Arxiv. Org. Cornell University Library, 201 Olin Library Cornell University Ithaca, NY 14853, Mar. 3, 2021 XP081905372 (7 pgs.).

(Continued)

*Primary Examiner* — Paul A Wartalowicz
(74) *Attorney, Agent, or Firm* — CANTOR COLBURN LLP

(57) ABSTRACT

A reservoir computer. In some embodiments, the reservoir computer includes a discrete element transmission line and a readout circuit. The discrete element transmission line may include a plurality of shunt-connected Josephson junctions and a plurality of series-connected inductors connected to the shunt-connected Josephson junctions. The readout circuit may be connected to at least three nodes of the discrete element transmission line.

14 Claims, 13 Drawing Sheets

(56) References Cited

U.S. PATENT DOCUMENTS

2020/0044632 A1 2/2020 Powell, III et al.
2021/0027138 A1 1/2021 Bedau et al.
2022/0093841 A1 3/2022 Rowlands et al.

OTHER PUBLICATIONS

International Search Report for corresponding International Application No. PCT/US2021/040925, filed Jul. 8, 2021, International Search Report dated Oct. 29, 2021 and mailed Nov. 10, 2021 (6 pgs.).
Written Opinion of the International Searching Authority for corresponding International Application No. PCT/US2021/040925, filed Jul. 8, 2021, Written Opinion of the International Searching Authority mailed Nov. 10, 2021 (9 pgs.).
Bai, K. et al., "DFR: An Energy-efficient Analog Delay Feedback Reservoir ComputingSystem for Brain-inspired Computing", ACM Journal on Emerging Technologies inComputing Systems, Dec. 2018, pp. 1-22, vol. 14, No. 4, Article 45, Association for Computing Machinery.
Hadley, P. et al., "Phase locking of Josephson-junction series arrays", Physical ReviewB, Nov. 1, 1988, pp. 8712-8719, vol. 38, No. 13, The American PhysicalSociety.
International Search Report and Written Opinion for PCT Application No. PCT/US2021/041687, dated Jan. 7, 2022, pp. 1-14.
Invitation to Pay Additional Fees and, Where Applicable, Protest Fee from corresponding International Patent Application No. PCT/US2021/041687, Invitation to Pay Additional Fees mailed Nov. 5, 2021.
Jensen, J. H. et al., "Reservoir Computing with a Chaotic Circuit", Proceedings of theECAL 2017, The MIT Press, Sep. 4-8, 2017, pp. 222-229, MassachusettsInstitute of Technology.
Schwartz et al., "Antiphase Switching in Josephson Junction Arrays", Physical Review Letters, vol. 73, No. 21, Nov. 21, 1994, pp. 2797-1800.
Vatin, J. et al., "Experimental reservoir computing using VCSEL polarization dynamics", Optics Express, Jun. 18, 2019, pp. 18579-18584, vol. 27, No. 13.
Watanabe et al. "Stability of periodic solutions in series arrays of Josephson junctions with internal capacitance", Arxiv. Org, Cornell University Library, 201 Olin Library Cornell University Ithaca, NY 14853, Nov. 1, 1996, XP080807793, pp. 1-41.
Coulombe, J. C. et al., "Computing with networks of nonlinear mechanical oscillators", PLOS ONE, Jun. 2, 2017, pp. 1-13, https://doi.org/10.1371/journal.pone.0178663.
Likharev, K. K. et al., "RSFQ Logic/Memory Family: A New Josephson-Junction Technology for Sub-Terahertz-Clock-Frequency Digital Systems", IEEE Transactions on Applied Superconductivity, Mar. 1991, pp. 3-28, vol. 1, No. 1, IEEE.
Ma, W. et al., "A Mott Insulator-based Oscillator Circuit for Reservoir Computing", IEEE Xplore, 2020, 5 pages, IEEE.
Rowlands, G. E. et al., "Reservoir Computing with Superconducting Electronics", Mar. 2020, pp. 1-6.
Rowlands, G. E. et al., "Reservoir Computing with Superconducting Electronics", Feb. 2021, pp. 1-7, arXiv:2103.02522v1.
Tanaka, G. et al., "Recent advances in physical reservoir computing: A review", Neural Networks, Mar. 20, 2019, pp. 100-123, Elsevier Ltd.
European Search Report; Application No. 21762168.9; mailed May 14, 2025, 9 pages.

\* cited by examiner

| Architecture | Fast JTL | Slow JTL | |
|---|---|---|---|
| Task | Parity | Parity | Chan. Eq. |
| Critical Current $I_c$ ($\mu$A) | 140 | 50 | 50 |
| Shunt Resistance ($\Omega$) | 1 | 2 | 2 |
| Total Capacitance $C$ (fF) | 185 | 670 | 670 |
| Stewart-McCumber $\beta_c$ | 0.08 | 0.4 | 0.4 |
| Number of JJs $N$ | 45 | 50 | 50 |
| Coupling Induct. $L$ (pH) | 10 | 35 | 35 |
| Bias Current $I_b$ | 0.8 $I_c$ | 0.8 $I_c$ | 1.75 $I_c$ |
| Input Resist. $R \pm \Delta R$ ($\Omega$) | 20 ± 2 | 20 | 20 |
| Input Current $I_{in} \pm \Delta I_{in}$ | (2.0 ± 0.2)$I_c$ | 0.29 $I_c$ | 0.32 $I_c$ |
| Input Fraction $f$ | 1.0 | 0.42 | 0.3 |
| Data Rate (GS/s) | 40 | 5.0 | 5.2 |
| Low-Pass Filt. Freq. (GHz) | 25 | 13.6 | 8 |
| Sampling Rate (GHz) | 400 | 25 | 26.3 |
| Training Data size | 1000 | 1000 | See Note* |
| Testing Data size | 500 | 1000 | See Note* |

FIG. 2B

SUPERCONDUCTING RESERVOIR COMPUTER WITH JOSEPHSON TRANSMISSION LINES

CROSS-REFERENCE TO RELATED APPLICATION(S)

The present application claims priority to and the benefit of U.S. Provisional Application No. 63/051,278, filed Jul. 13, 2020, entitled "SUPERCONDUCTING RESERVOIR COMPUTER BASED ON SPECIALIZED JOSEPHSON TRANSMISSION LINES", the entire content of which is incorporated herein by reference.

FIELD

One or more aspects of embodiments according to the present invention relate to reservoir computers, and more particularly to a reservoir computer including a Josephson junction transmission line.

BACKGROUND

Reservoir computers may be employed for various computational tasks. Some such tasks may have significant throughput requirements, not readily met by related art reservoir computers.

Thus, there is a need for an improved reservoir computer.

SUMMARY

According to an embodiment of the present disclosure, there is provided a system, including: a discrete element transmission line; and a readout circuit, wherein: the discrete element transmission line includes: a plurality of shunt-connected Josephson junctions, and a plurality of series-connected inductors connected to the shunt-connected Josephson junctions; and the readout circuit is connected to at least three nodes of the discrete element transmission line.

In some embodiments, the plurality of shunt-connected Josephson junctions includes 10 Josephson junctions.

In some embodiments, the system further includes a bias circuit configured to supply a bias current to the shunt-connected Josephson junctions.

In some embodiments: a first Josephson junction of the plurality of shunt-connected Josephson junctions has a first critical current; a second Josephson junction of the plurality of shunt-connected Josephson junctions has a second critical current; and the second critical current differs from the first critical current by at least 2%.

In some embodiments, the bias circuit is configured to supply, to the first Josephson junction, a bias current greater than the first critical current.

In some embodiments, the system further includes an input circuit connected to a set of nodes of the discrete element transmission line, the set of nodes consisting of n nodes, n being a positive integer less than the number of shunt-connected Josephson junctions.

In some embodiments, a first gap between adjacent nodes of the set of nodes spans fewer of the shunt-connected Josephson junctions than a second gap between adjacent nodes of the set of nodes.

In some embodiments, the second gap spans at least 2 more Josephson junctions than the first gap.

In some embodiments, the input circuit is connected: to a first node of the discrete element transmission line through a first resistor, and to a second node of the discrete element transmission line through a second resistor, the second resistor having a resistance at least 2% greater than the first resistor.

In some embodiments, the readout circuit is connected to M nodes of the discrete element transmission line, M being a positive integer less than the number of shunt-connected Josephson junctions.

In some embodiments, M is a positive integer less than 0.7 times the number of shunt-connected Josephson junctions.

In some embodiments, the readout circuit is not connected to a first node of the discrete element transmission line, and a node-loading circuit is connected to the first node.

In some embodiments, a first end of the discrete element transmission line is terminated by a resistance.

In some embodiments: the readout circuit is connected: to a first node of the discrete element transmission line, and to a second node of the discrete element transmission line; and the readout circuit is configured to: multiply a signal from the first node by a first weight to form a first product, multiply a signal from the second node by a second weight to form a second product, and add the first product and the second product.

In some embodiments: the readout circuit includes a first single-flux-quantum gate, and the readout circuit is configured to multiply the signal from the first node by the first weight using the first single-flux-quantum gate.

According to an embodiment of the present disclosure, there is provided a method, including: training a reservoir computer; and operating the reservoir computer, wherein: the reservoir computer includes: a discrete element transmission line, and a readout circuit; the discrete element transmission line includes: a plurality of shunt-connected Josephson junctions, and a plurality of series-connected inductors connected to the shunt-connected Josephson junctions; and the readout circuit is connected to at least three nodes of the discrete element transmission line.

In some embodiments, the training includes: transmitting data through a data transmission channel to form received data; processing the received data with the reservoir computer to form processed data; and adjusting weights of the readout circuit to minimize a cost function, the cost function being based on a difference between transmitted data and processed data.

In some embodiments, the plurality of shunt-connected Josephson junctions includes 10 Josephson junctions.

In some embodiments, the method further includes a bias circuit configured to supply a bias current to the shunt-connected Josephson junctions, wherein the bias circuit is configured to supply, to a first Josephson junction of the plurality of shunt-connected Josephson junctions, a bias current greater than the critical current of the first Josephson junction.

In some embodiments, the reservoir computer further includes an input circuit connected to a set of nodes of the discrete element transmission line, the set of nodes consisting of n nodes, n being a positive integer less than the number of shunt-connected Josephson junctions.

BRIEF DESCRIPTION OF THE DRAWINGS

Features, aspects, and embodiments are described in conjunction with the attached drawings, in which:

FIG. 2B is a table of reservoir computer parameters, according to an embodiment of the present disclosure;

DETAILED DESCRIPTION

The detailed description set forth below in connection with the appended drawings is intended as a description of exemplary embodiments of a Josephson junction transmission line reservoir computer provided in accordance with the present disclosure and is not intended to represent the only forms in which some embodiments may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
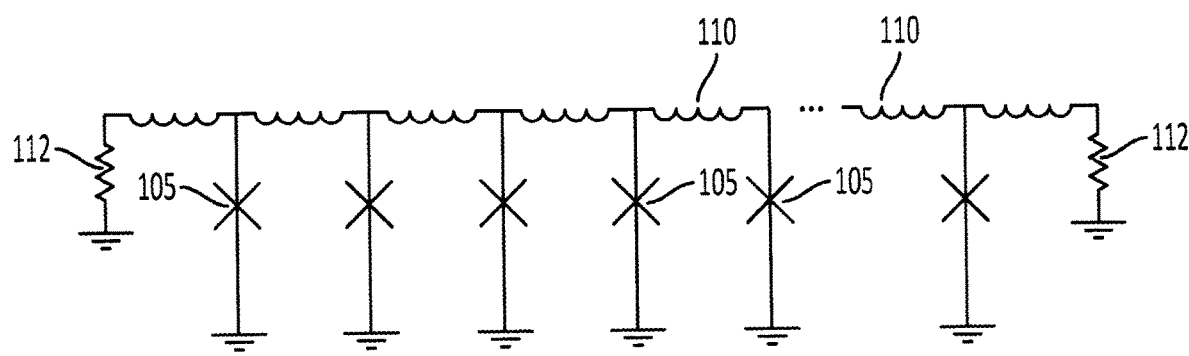
FIG. 1A is a schematic diagram of a portion of a reservoir computer, according to an embodiment of the present disclosure.

FIGS. 1A-1E show several sub-circuits of a portion of a reservoir computer, in some embodiments. In each successive drawing of FIGS. 1A-1E, an additional sub-circuit, having a respective function, is illustrated. FIG. 1A shows a Josephson junction transmission line. In some embodiments, the Josephson junction transmission line includes alternating shunt-connected Josephson junctions 105, and series-connected inductors 110. The Josephson junction transmission line may be referred to as a discrete element transmission line. As used herein, a "discrete element transmission line" is a structure including a plurality of shunt elements (such as the Josephson junctions 105) and a plurality of series elements (such as the series-connected inductors 110). Such a structure may have certain characteristics similar to those of a continuous transmission line, which may be approximated by a discrete element structure including a plurality of shunt capacitors and a plurality of series inductors. As shown in FIG. 1A, the Josephson junction transmission line may be terminated at either end by resistances 112 matched to the characteristic impedance of the Josephson junction transmission line, creating an absorbing boundary condition for pulses at the edges of the Josephson junction transmission line.

Figure 1B:
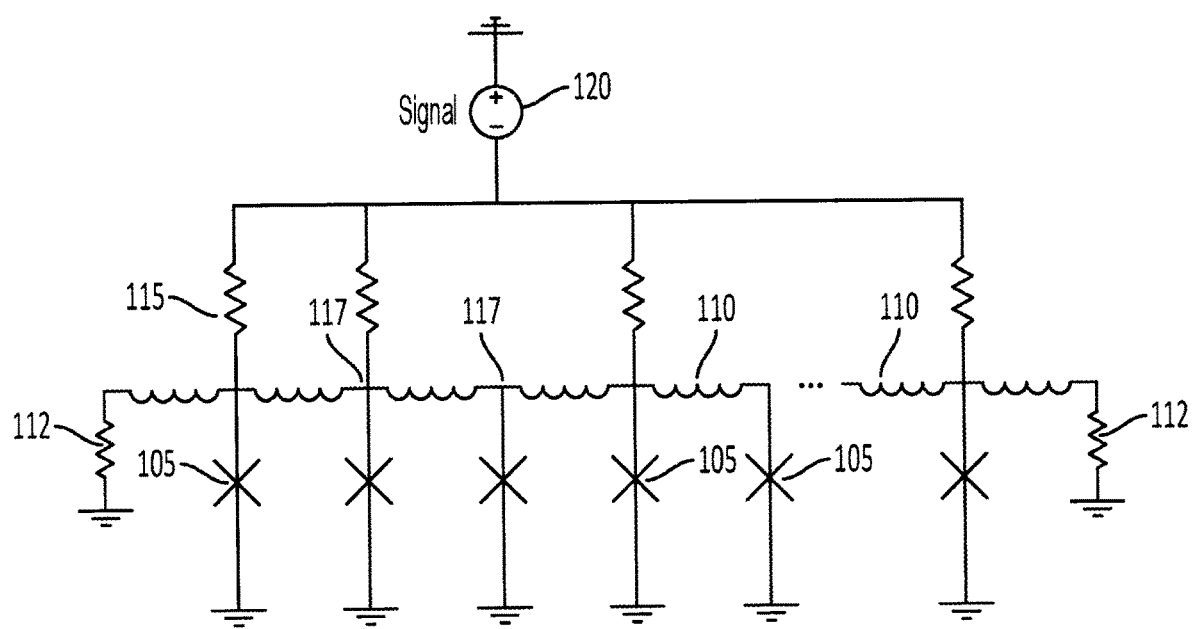
FIG. 1B is a schematic diagram of a portion of a reservoir computer, according to an embodiment of the present disclosure.

FIG. 1B shows an input circuit, in addition to the Josephson junction transmission line illustrated in FIG. 1A. The input circuit includes a plurality of input resistors 115, each connected to a respective input-output node 117 of the Josephson junction transmission line. A common signal source 120, supplying an input signal to be processed, may be connected to all of the input resistors 115 as shown. The input-output nodes 117 to which the input resistors 115 are connected may be spaced nonuniformly along the Josephson junction transmission line, e.g., as shown, to introduce heterogeneity into the reservoir computer (as discussed in further detail below).

For example, a first gap between adjacent input-output nodes 117 (e.g., the gap (which spans no Josephson junctions) between the leftmost input-output node 117 in FIG. 1B and the input-output node 117 immediately to its right) may span fewer Josephson junctions 105 than a second gap between adjacent input-output nodes 117 (e.g., the gap (which spans one Josephson junction) between the second Josephson junction 105 from the left and the fourth Josephson junction 105 from the left). As used herein, a gap between consecutive input connections is said to "span" k Josephson junctions 105 if (i) each of k Josephson junctions 105 in the gap lacks an input connection at the node at which the Josephson junction 105 is connected to the chain of series-connected inductors 110 and (ii) there are no input connections between the k Josephson junctions 105 (e.g., at midpoints of the series-connected inductors 110 connecting the k Josephson junctions 105).

Figure 1C:
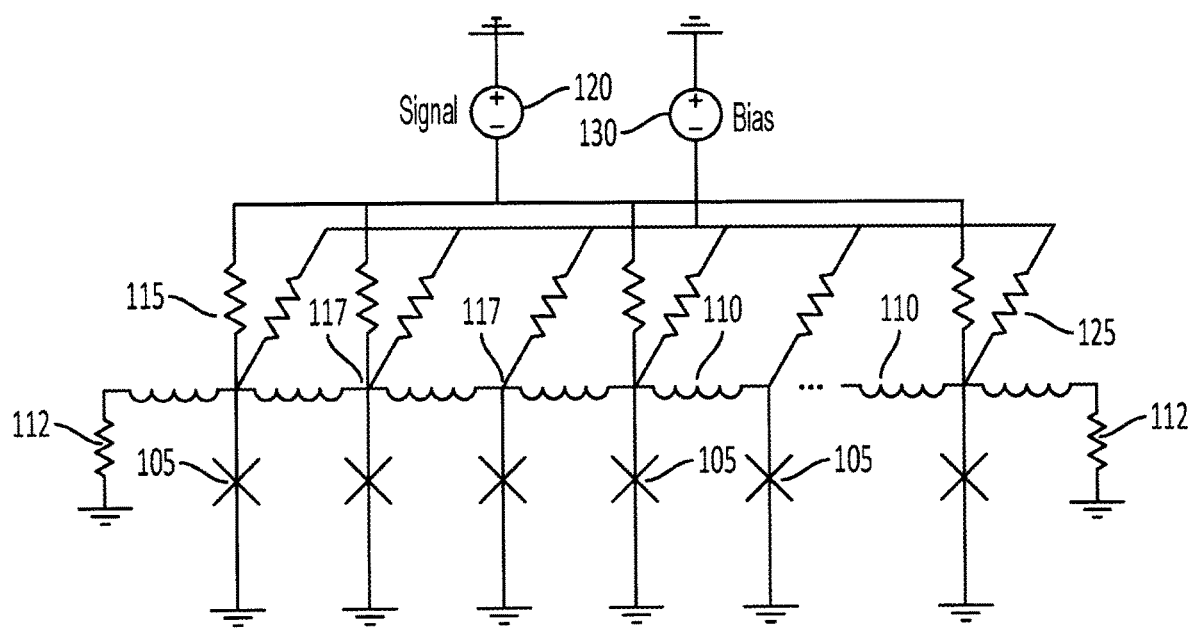
FIG. 1C is a schematic diagram of a portion of a reservoir computer, according to an embodiment of the present disclosure.

FIG. 1C shows a bias circuit, in addition to the Josephson junction transmission line and the input circuit illustrated in FIG. 1B. The bias circuit includes a plurality of bias resistors 125 each connected to a respective input-output node 117 of the Josephson junction transmission line. The resistors are driven by a bias supply 130. Each of the bias resistors may have a resistance somewhat larger than the characteristic resistance of the Josephson junctions 105; for example the characteristic resistance of the Josephson junctions 105 may be about 4 ohms and the resistance of each of the bias resistors 125 may be about 20 ohms. In some embodiments, fewer bias resistors than the number of Josephson junctions 105 are used, or a network of inductors is used, to provide the bias.

Figure 1D:
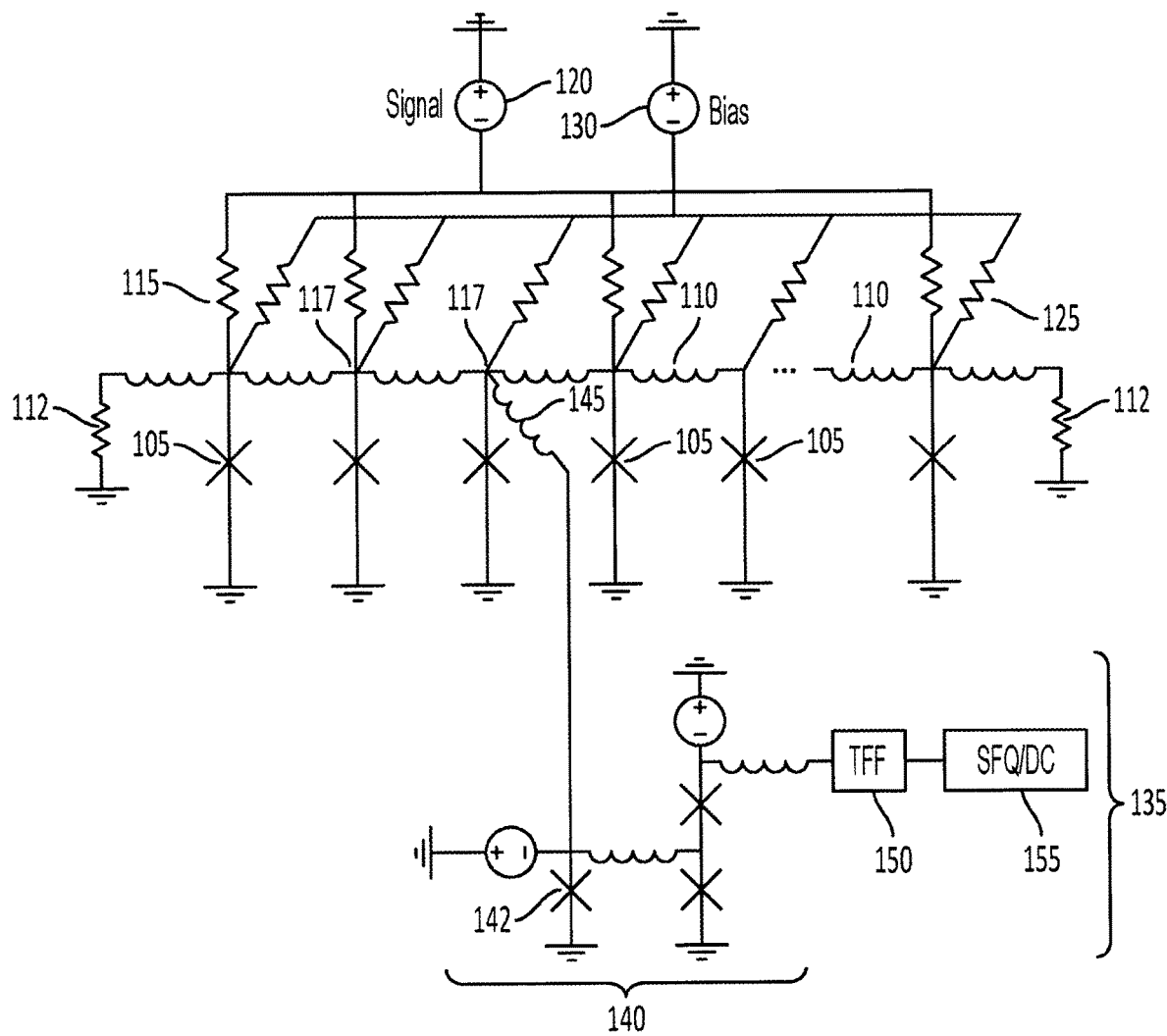
FIG. 1D is a schematic diagram of a portion of a reservoir computer, according to an embodiment of the present disclosure.

FIG. 1D shows an output circuit 135 and an output inductor 145, in addition to the bias circuit, the Josephson junction transmission line, and the input circuit illustrated in FIG. 1C. The output circuit 135 includes a signal-conditioning circuit 140 connected, through the output inductor 145, to an input-output node 117 of the Josephson junction transmission line. In some embodiments, a plurality of output inductors 145, each connecting a respective signal-conditioning circuit 140 to a respective input-output node of the Josephson junction transmission line, may be present. The signal-conditioning circuit 140 may include a first Josephson junction 142 that may be referred to as an "output junction" and two further Josephson junctions (shown to the right of the output junction 142 in FIG. 1D) that are part of a buffer 425 (FIG. 4D). Each output inductor 145 may have an inductance comparable to any of the series-connected inductors 110. Each input-output node 117 may be a node at an end of one of the series-connected inductors 110, or (as discussed in further detail below) at a point along the length of one of the series-connected inductors 110 (in which case the series-connected inductors 110 may equivalently be considered to be two inductors connected in series, and the input-output node 117 may be the node at which the two inductors are connected together). An input-output node 117 may be used (i) for input only (e.g., it may be connected to the input circuit and not to the output circuit), (ii) for output only (e.g., it may be connected to the output circuit and not to the input circuit), or (iii) for both input and output (e.g., it may be connected to the input circuit and to the output circuit).

The signal-conditioning circuit 140 may include an output junction and buffer stage to condition the reservoir response into discrete SFQ pulses. The output circuit 135 may further include a toggle flip-flop (TFF) 150 and an SFQ-to-DC converter 155 to decimate the pulses by a factor of 4 and to output a non-return-to-zero (NRZ) signal whose transitions give a time-encoding of the original signal amplitude. In some embodiments, an output inductor 145 and a signal-conditioning circuit 140 is present for each of the Josephson junctions. Sufficient redundancy may be present in the information received from the Josephson junctions in such an embodiment, however, that its performance may not be significantly superior to that of an embodiment in which fewer output connections are present, e.g., in which an output connection is present only for every other Josephson junction, or even fewer (e.g., every third, every fourth, or every fifth Josephson junction).

In the embodiment of FIG. 1D, the output of each SFQ-to-DC converter 155 may be converted to a digital signal (e.g., using an analog to digital converter (which may be in a portion of the reservoir computer operating at room temperature)), each digital signal may be multiplied by a respective weight, and the products may be summed to form a single output signal for the reservoir computer. The weights may be obtained by training (as discussed in further detail below). In other embodiments, the multiplication by the weights and the summing of the products may instead be performed by a portion of the reservoir computer operating at cryogenic temperatures (e.g., by a set of SFQ gates). In such an embodiment, the toggle flip-flop 150 and the SFQ-to-DC converter 155 may be absent and the signal-conditioning circuit 140 may be directly connected to the SFQ gates, which may digitize and perform multiplication and addition. In either case, the signal-conditioning circuit 140 may reduce backaction of the measurement circuit on the reservoir.

Figure 1E:
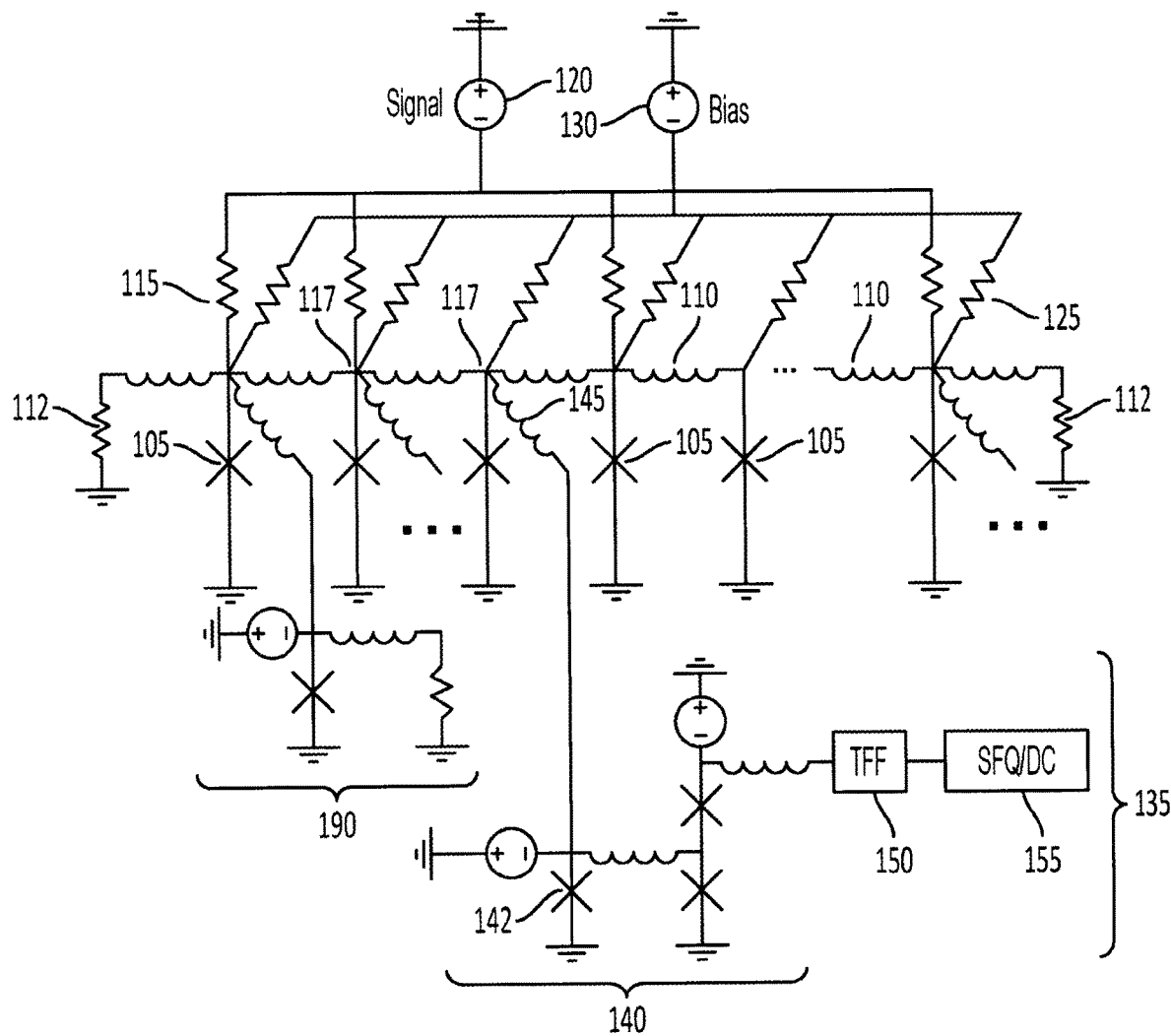
FIG. 1E is a schematic diagram of a portion of a reservoir computer, according to an embodiment of the present disclosure.

FIG. 1E shows a node-loading circuit 190, in addition to the output circuit, the bias circuit, the Josephson junction transmission line, and the input circuit illustrated in FIG. 1D. The node-loading circuit 190 may be connected to input-output nodes 117 to which no output inductor 145 and signal-conditioning circuit 140 is connected, so that the loading, and the bias condition, are substantially uniform along the length of the transmission line.

In operation, all of the Josephson junctions may be biased with a global voltage $V_b$ that results in a per-Josephson junction bias current $I_b=V_b/R$ for bias resistance R. For $I_b$ less than their critical currents $I_c$, the Josephson junctions may actively propagate existing pulses. For $I_b$ greater than $I_c$, the Josephson junctions may enter oscillatory states the frequencies of which are a nonlinear function of the total junction current. Because the Josephson junctions modulate each others' currents, a complex dynamical state is achieved. In this regime, the Josephson junction transmission line may act, in effect, as an analog liquid state machine.

As mentioned above, the input signal may be connected to a subset (e.g., to a proper subset) of the Josephson junctions 105 (or to a subset of the input-output nodes 117) through input resistors 115 to produce currents in the Josephson junction transmission line. The fraction of input-output nodes 117 to which the input signal is connected may be referred to as the "input fraction" f of the reservoir computer. Using a spread in the resistances of the input resistors 115 or connecting such input resistors only to a proper subset of the Josephson junctions 105 or to a proper subset of the input-output nodes 117 may avoid input symmetries that if present may produce spatially homogeneous, and therefore computationally uninteresting, dynamics. Heterogeneity in other parameters, such as per-junction variations of $I_c$, may also suffice. While natural fabrication-induced spreads in these parameters may be enough to achieve sufficient heterogeneity, deliberately engineering asymmetry may be a more reliably method for assuring success.

Figure 2A:
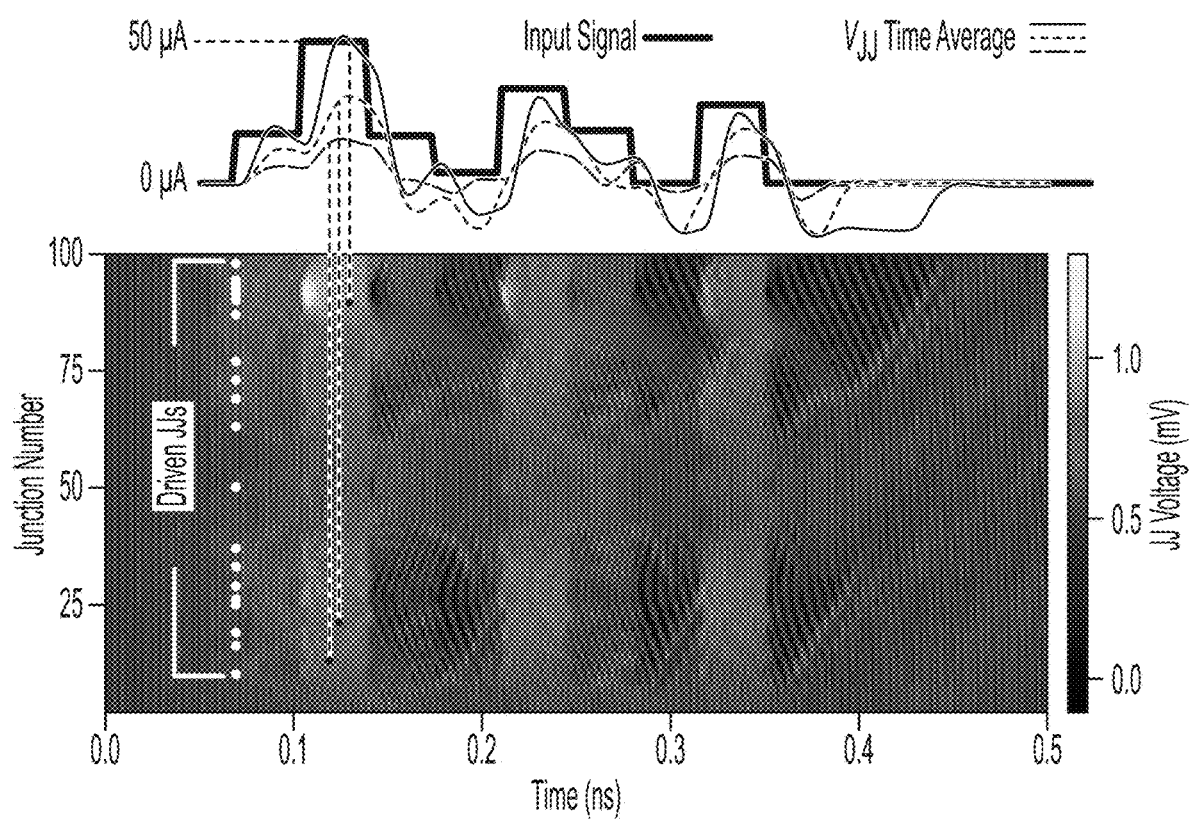
FIG. 2A is a graphical representation of the response of a reservoir computer, according to an embodiment of the present disclosure.

The voltage response of an example reservoir with N=100 Josephson junctions is shown in FIG. 2A. FIG. 2A shows the reservoir response to the displayed 35-ps sample-and-hold input waveform, showing the voltages across each Josephson junction in a chain of 100. Only twenty percent of the Josephson junctions (identified by the white dots) are driven with the input signal shown in the upper portion of FIG. 2A. The time-averaged voltages are shown, for a few indicated junctions, superimposed on the input signal.

The white dots in FIG. 2A show the locations of driven Josephson junctions, from which wave-like modulations in the >200 GHz oscillation frequencies radiate. The time-averaged voltage of the Josephson junctions, which is related to their average oscillation rates, may be taken as the reservoir output quantity. The time-averaged responses for a few junctions are shown in FIG. 2A as obtained through a 60-GHz-cutoff low-pass filter.

In some embodiments, application of input stimuli and data acquisition are performed with room temperature equipment. The dynamics of a Josephson junction transmission line may be too rapid to pass to room temperature through transmission lines, so the circuit may be modified (e.g., by the addition of shunt capacitors, discussed in further detail below) to slow down the dynamics (to form a so-called "slow" Josephson junction transmission line; the unmodified Josephson junction transmission line may be referred to as a "fast" Josephson junction transmission line), and a single-flux-quantum (SFQ) output stage that further reduces the data rate with decimation may be implemented. The circuit parameters for these "fast" and "slow" variants of the Josephson junction transmission line reservoir computer, and any differences between these parameters for different reservoir applications, are shown in the table of FIG. 2B.

The output stage for the slow Josephson junction transmission line is shown in FIG. 1D. As mentioned above, an output junction and buffer stage condition the reservoir response into discrete SFQ pulses, then a toggle flip-flop (TFF) and SFQ-to-DC converter decimate the pulses by a factor of 4 and output a non-return-to-zero (NRZ) signal whose transitions give a time-encoding of the original signal amplitude and can readily pass through a 12-GHz microwave output chain. The original return-to-zero (RZ) Josephson junction response signals from this NRZ output can be recovered using various methods, such as a simple procedure of low-pass filtering a chain of impulses, each located at a respective zero-crossing.

Figure 2C:
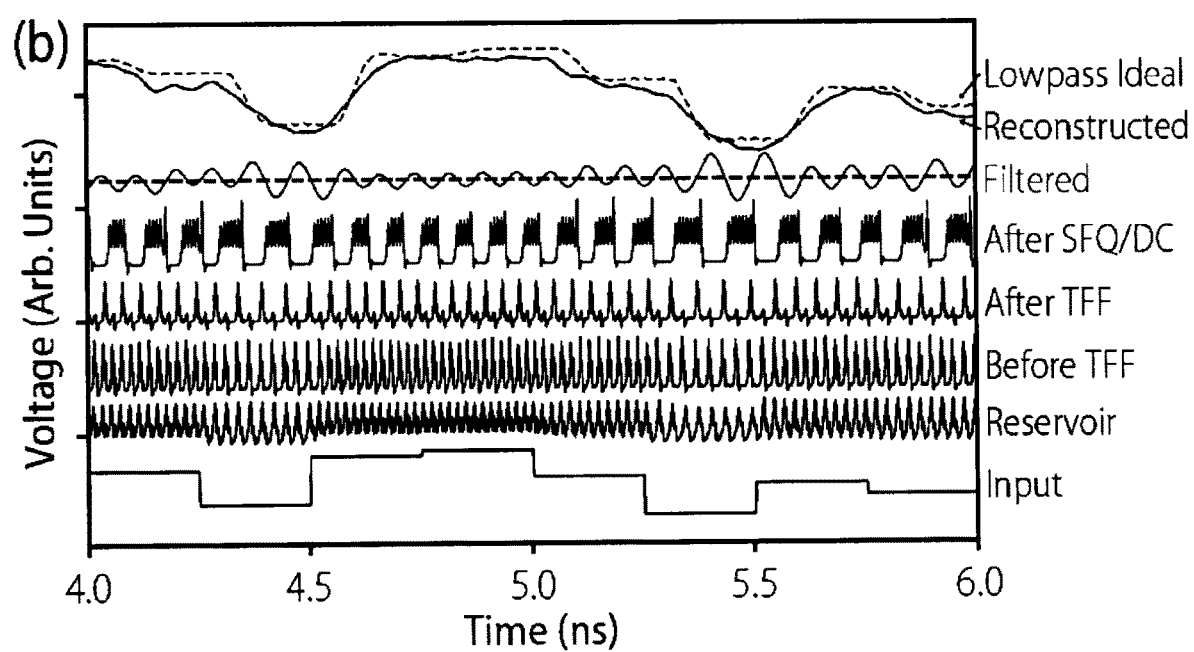
FIG. 2C is a graph of signals in a reservoir computer, according to an embodiment of the present disclosure.

The behavior of this overall readout scheme is shown in FIG. 2C, which shows the final reconstructed output signal, compared to the direct Josephson junction voltages with low-pass filtering (which are the outputs used for the fast Josephson junction transmission line). FIG. 2C shows the simulated signal as it evolves, from bottom to top, while passing through the output stage in response to the reservoir stimulus shown at the bottom. The threshold for signal reconstruction is shown as the dotted line at the mean of the "filtered" response and the resulting reconstruction is compared to the "ideal" time-averaged reservoir response.

A simulation has shown that the slow Josephson junction transmission line achieves compelling performance and accuracy when employed for channel equalization on scrambled symbols that have passed through a noisy nonlinear channel with inter-symbol interference. This suggests that this architecture is well suited for complex high-rate signal processing applications.

Channel equalization is the process of recovering the symbols that are degraded during transmission over a particular channel, and is of immense technological importance for communications systems. A noisy channel exhibiting inter-symbol interference and nonlinear receiver saturation effects is modeled in the simulation, and a four-level pulse amplitude modulation scheme (PAM-4) is assumed.

The circuits were simulated using WRspice, an open-source SPICE implementation with sophisticated Josephson junction models. An input signal is fed through the simulated circuit while its response $X(t)$ is recorded from M of the junction outputs. The input signal has a sample-and-hold period $\theta$ and a rise/fall time of approximately 0.1 $\theta$. It is assumed that a total of Q symbols are contained within $X(t)$, and that the sampling rate of the output yields K samples per interval $\theta$. The memory of the reservoir makes it possible to solve for the weights using only the weights from the current sample-and-hold interval. Accordingly, $X(t)$ is reshaped to a (KM×Q) matrix whose columns contain the stacked per-symbol responses of all junctions. Ridge regression may be performed, using half of the recorded data, to identify the output weights W that minimize the quantity $$|\tilde{Y} - WX|^2 + \alpha |W|^2, \quad (1)$$

where $\tilde{Y}$ is the truth vector and $\alpha$ a regularization parameter that prevents over-fitting and is chosen to maximize performance. Because each symbol may be treated as a separate observation, W is a simple row vector of length KM that multiplies the columns of X. For channel equalization (with M=12 and K=5), W is of length 60. With the remaining half of the data, the equalized symbols Y=WX are predicted and rounded to the nearest levels, i.e. (−3, −1, 1, 3). The vector W may be relatively small, and both prediction and training may be computationally straightforward.

In the simulation, random PAM-4 sequences were generated from the values (−3, −1, 1, 3) and converted into signals $v(t)$ with sample-and-hold time $\theta$ and a 10 ps rise/fall time. Next, $v(t)$ was subjected to the channel transformation function g and additive Gaussian white noise (AWGN) to produce $v'(t)=g(v(t))+\mathcal{N}(0,\sigma)$ where $\mathcal{N}(0, \sigma)$ is a zero-mean normal distribution, with a standard deviation $\sigma$ that was determined by the signal-to-noise ratio (SNR) of the channel. The input voltage $V_{in}(t)$ was scaled so that it produced currents across the junctions within the interval $g[0, I_{in}]$. Simulations were performed using the slow Josephson junction transmission line described above.

For training, $V_{in}(t)$ may be applied to the reservoir to produce the output signal $X(t)$. Using ridge regression, weights W, such that the predicted channel input signal Y=WX best reproduces the desired response $\tilde{Y} \equiv [v_i]$ (i.e., such that a cost function based on a difference between transmitted data and processed data, is minimized), may be identified. The equalization performance is expressed in terms of the symbol error rate (SER) for any elements of Y that do not match the elements of $\tilde{Y}$. The simulation has shown that the reservoir performs well for input fractions f=10%-40%, and that its performance does not degrade when as few as every fourth Josephson junction (M=12) is included in X. A smaller or larger number of Josephson junctions may be used in the reservoir, although the performance may begin to degrade with fewer than 20 Josephson junctions. A crude optimization of the reservoir's operating conditions may be performed with successive one-dimensional parameter sweeps. Such an optimization was performed, and found that bias current $I_b$=1.75 $I_c$, input signal amplitude $I_{in}$=0.32 $I_c$, and sample-and-hold time $\theta$=190 ps produce good performance. More exhaustive hyperparameter searches may be performed with techniques such as Bayesian optimization. The reservoir performance is robust and is a slowly varying function of all the parameters mentioned above.

Figure 3:
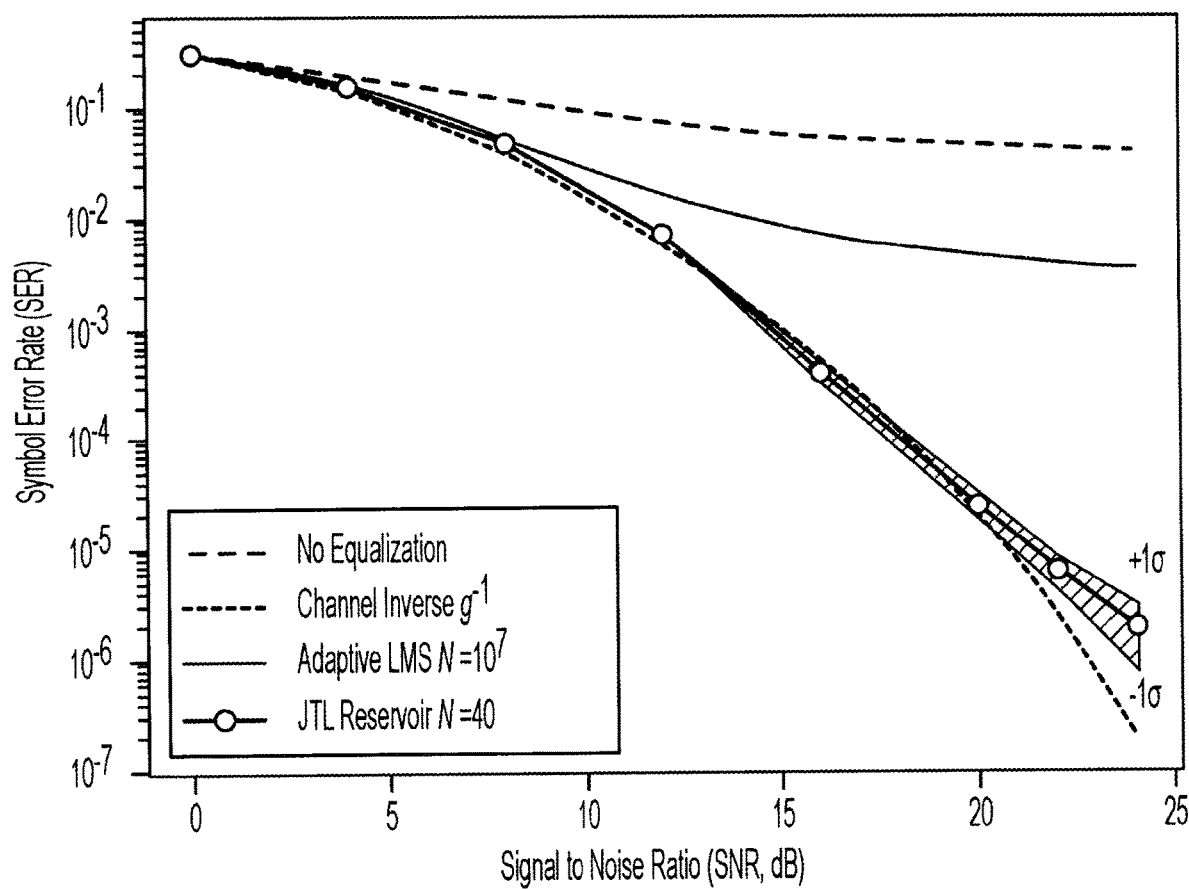
FIG. 3 is a graph of simulated performance of a reservoir computer, according to an embodiment of the present disclosure.

The equalization performance is summarized in FIG. 3 for SNRs from 0 dB-24 dB, with SERs reaching $10^{-6}$ at the end of this range. The sequence length is adjusted to ensure that the uncertainty in the SER, as calculated from the standard deviation of the corresponding β-distribution, remains small. Also shown in FIG. 3 is (i) the performance of an adaptive least mean squares (ALMS) equalizer trained on $10^7$ symbols, which performs poorly given the exaggerated nonlinearity of the channel, and (ii) the performance of equalization performed directly with the channel inverse transformation function $g^{-1}(v'(t))$, which nevertheless cannot correct for AWGN. The reservoir computer performs near this level, suggesting that it has learned to implement $g^{-1}$. In principle the reservoir may perform better than $g^{-1}$ since it may learn details of the modulation scheme and noise spectrum during training that can be used to construct a more noise-tolerant equalization strategy. The data rate at which this equalization is performed is 10.5 Gb/s (5.2 GS/s for 2-bit symbols). As mentioned above, this simulation was performed for the slow Josephson junction transmission line (intentionally designed to operate at reduced frequencies, to enable off-chip post-processing); PAM-4 equalization rates of 80-100 Gb/s may be possible using the fast Josephson junction transmission line implementation.

Other applications of a Josephson junction transmission line reservoir computer may include speech processing (with processing rates that may be approximately 1 billion times faster than real time), parity checking (at rates exceeding 100 Gb/s), ultrafast random number generation, and analog preprocessing for a variety of signal processing applications.

Figure 4A:
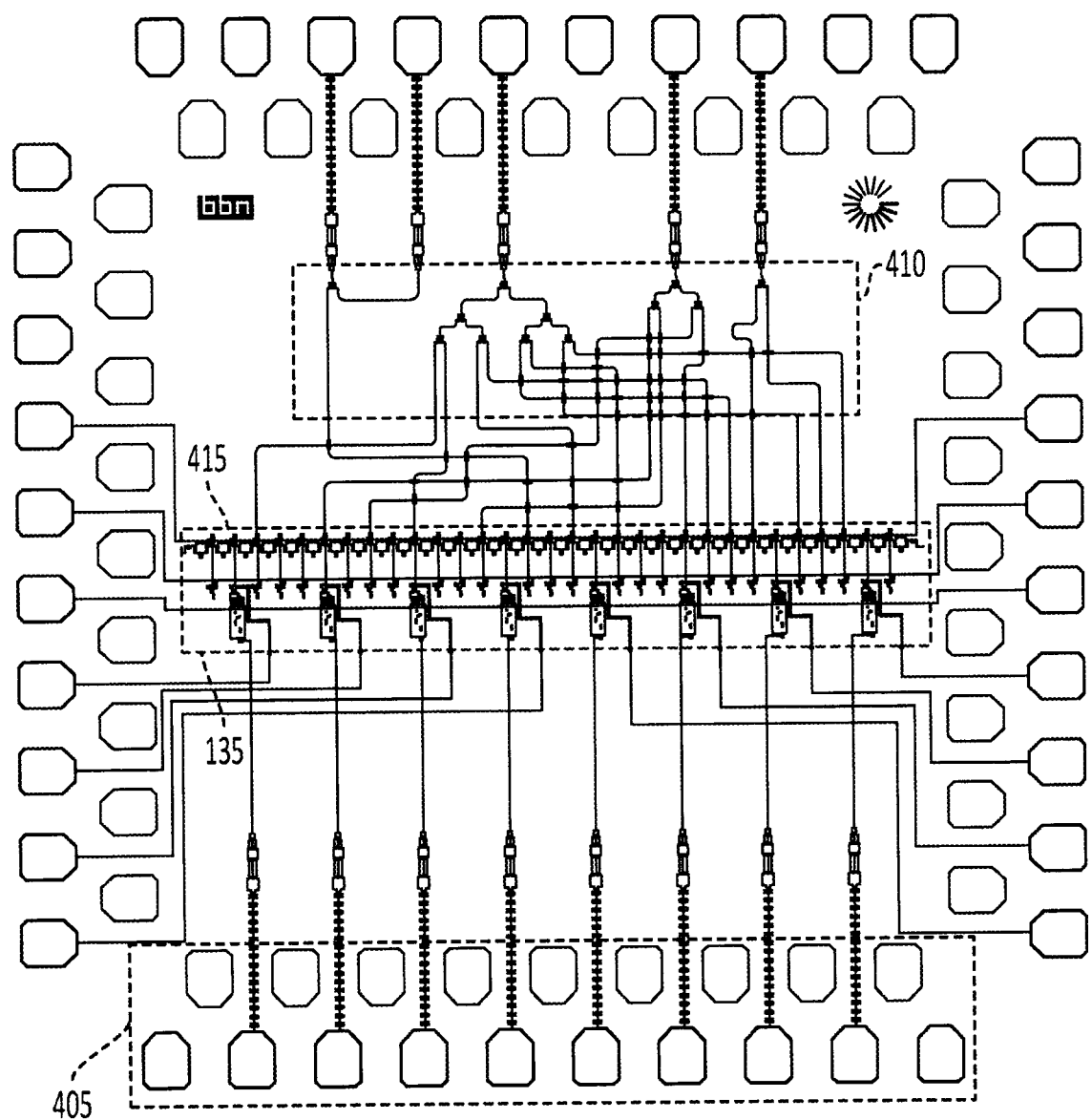
FIG. 4A is a layout drawing of a reservoir computer chip, according to an embodiment of the present disclosure.

FIG. 4A shows a layout of a demonstration chip implementing a Josephson junction transmission line reservoir computer. The chip may include standard pads 405 around the perimeter. An irregular RF input scheme 410 may make it possible to select (by selecting which of several input pads are driven by the input signal) which input-output nodes of the Josephson junction transmission line 415 are driven. An array of output circuits 135 is used to read out the processed signal at a subset of the input-output nodes.

Figure 4B:
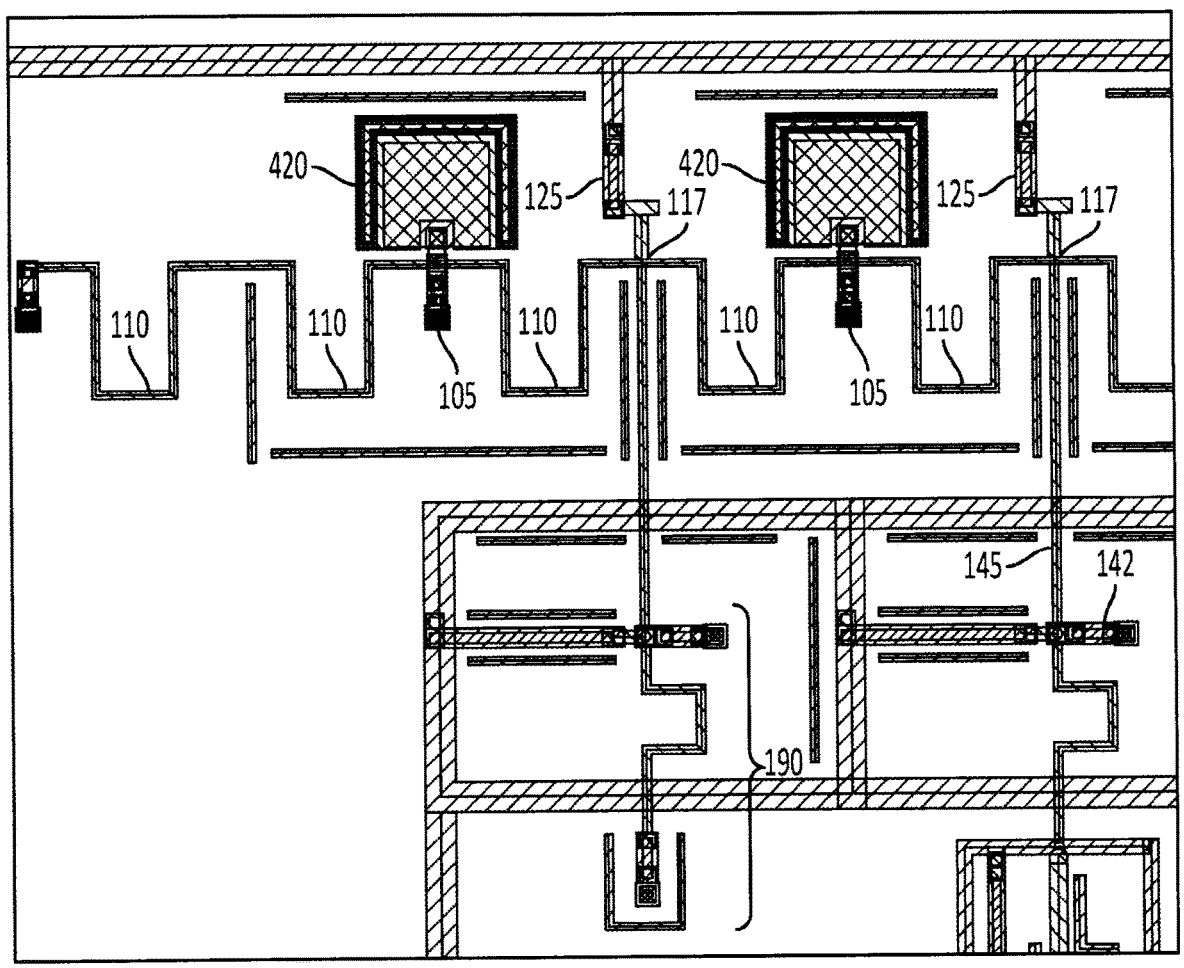
FIG. 4B is a drawing of a portion of a reservoir computer chip, according to an embodiment of the present disclosure.
Figure 4C:
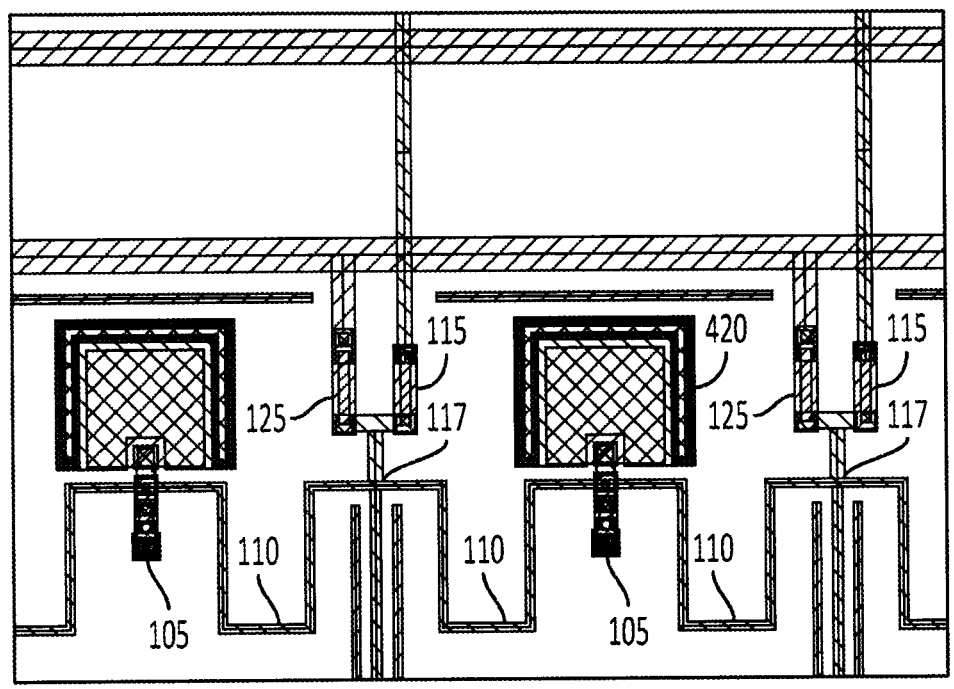
FIG. 4C is a drawing of a portion of a reservoir computer chip, according to an embodiment of the present disclosure.
Figure 4D:
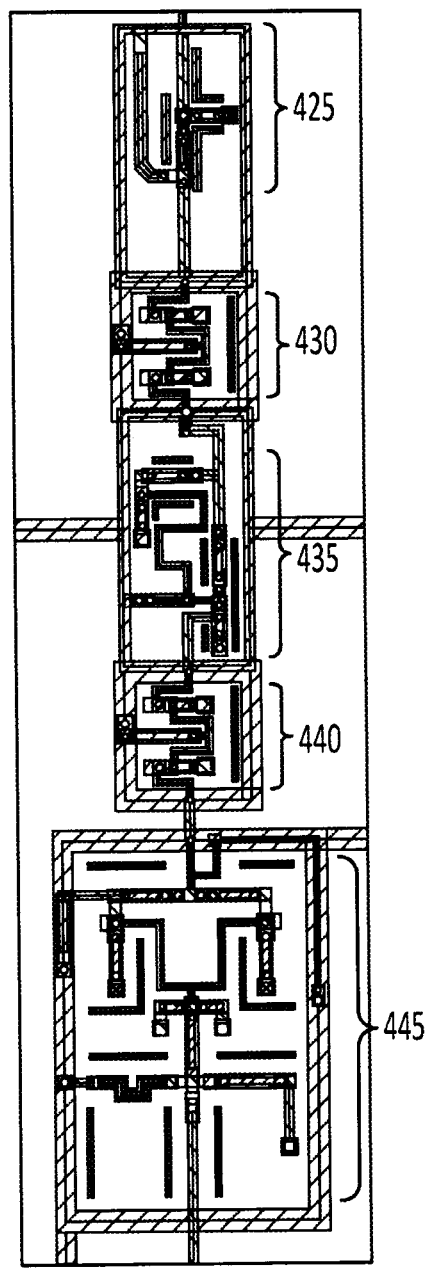
FIG. 4D is a drawing of a portion of a reservoir computer chip, according to an embodiment of the present disclosure.

FIG. 4B shows an enlarged view of a first portion of FIG. 4A. A shunt capacitance 420 is connected in parallel with each of the Josephson junctions, which are connected to the series-connected inductors 110 (each of which is a superconducting trace). In the embodiment of FIGS. 4A-4D, two series-connected inductors 110 are present between each pair of adjacent Josephson junctions 105, and each input-output node 117 is at the node at which the two series-connected inductors 110 are connected. Equivalently, each pair of series-connected inductors 110 may be considered to be a single inductor, with an external connection made to a point (an input-output node 117) part-way along its length (e.g., it may be a center-tapped inductor, as show in FIG. 4B). Bias current may flow through bias resistors 125 to the input-output nodes 117. In FIG. 4B a node-loading circuit 190 is connected to one of the input-output nodes 117 and an output inductor 145 provides a connection to an output circuit 135 (FIG. 4D). FIG. 4C shows a portion of the Josephson junction transmission line, including two input-output nodes 117 to which input resistors 115 are connected. FIG. 4D shows an output circuit 135, including a buffer 425, a first Josephson junction transmission line stage 430, a TFF 435, a second Josephson junction transmission line stage 440, and an SFQ-to-DC converter 445. The first Josephson junction transmission line stage 430 and the second Josephson junction transmission line stage 440 (which are not shown in FIGS. 1D and 1E) may be included to ensure signal integrity. The output junction 142 (FIGS. 1D, 1E, and 4B) may have a critical current (e.g., 75 microamperes) intermediate to (i) that of the Josephson junctions 105 of the Josephson junction transmission line (which may be about 50 microamperes) and (ii) that of the Josephson junctions following the output junction 142 in the output circuit 135 (which may be about 100 microamperes).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B. As used herein, when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors) that do not qualitatively affect the behavior of the circuit. As used herein, if a second set is a "subset" of a first set, the first set contains all of the elements of the second set. If a second set is a "proper subset" of a first set, the first set contains (i) all of the elements of the second set and (ii) at least one element absent from the second set. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Although limited embodiments of a Josephson junction transmission line reservoir computer have been specifically described and illustrated herein, many modifications and variations will be apparent to those skilled in the art. Accordingly, it is to be understood that a Josephson junction transmission line reservoir computer employed according to principles of this disclosure may be embodied other than as specifically described herein. Features of some embodiments are also defined in the following claims, and equivalents thereof.

What is claimed is:

1. A system, comprising:
   a discrete element transmission line; and
   a plurality of readout circuits,
   wherein:
   the discrete element transmission line comprises:
   a plurality of shunt-connected Josephson junctions, and
   a plurality of series-connected inductors connected to the shunt-connected Josephson junctions;
   at least two of the plurality of readout circuits are connected to at least three nodes of the discrete element transmission line; and
   a bias circuit configured to supply a bias current to the shunt-connected Josephson junctions.

2. The system of claim 1, wherein:
   a first Josephson junction of the plurality of shunt-connected Josephson junctions has a first critical current;
   a second Josephson junction of the plurality of shunt-connected Josephson junctions has a second critical current; and
   the second critical current differs from the first critical current by at least 2%.

3. The system of claim 2, wherein the bias circuit is configured to supply, to the first Josephson junction, a bias current greater than the first critical current.

4. The system of claim 1, further comprising an input circuit connected to a set of nodes of the discrete element transmission line, the set of nodes consisting of n nodes, n being a positive integer less than the number of shunt-connected Josephson junctions.

5. The system of claim 4, wherein a first gap between adjacent nodes of the set of nodes spans fewer of the shunt-connected Josephson junctions than a second gap between adjacent nodes of the set of nodes.

6. The system of claim 5, wherein the second gap spans at least 2 more Josephson junctions than the first gap.

7. The system of claim 4, wherein the input circuit is connected:
   to a first node of the discrete element transmission line through a first resistor, and
   to a second node of the discrete element transmission line through a second resistor,
   the second resistor having a resistance at least 2% greater than the first resistor.

8. The system of claim 1, wherein a first readout circuit of the plurality of readout circuits is connected to M nodes of the discrete element transmission line, M being a positive integer less than the number of shunt-connected Josephson junctions.

9. The system of claim 8, wherein M is a positive integer less than 0.7 times the number of shunt-connected Josephson junctions.

10. The system of claim 9, wherein the first readout circuit is not connected to a first node of the discrete element transmission line, and a node-loading circuit is connected to the first node.

11. The system of claim 8, wherein:
    the readout circuit is connected:
    to a first node of the discrete element transmission line, and
    to a second node of the discrete element transmission line; and
    the readout circuit is configured to:
    multiply a signal from the first node by a first weight to form a first product,
    multiply a signal from the second node by a second weight to form a second product, and
    add the first product and the second product.

12. The system of claim 11, wherein:
the readout circuit comprises a first single-flux-quantum gate, and
the readout circuit is configured to multiply the signal from the first node by the first weight using the first single-flux-quantum gate.

13. The system of claim 1, wherein the plurality of shunt-connected Josephson junctions comprises 10 Josephson junctions.

14. A system, comprising:
a discrete element transmission line; and
a readout circuit,
wherein:
the discrete element transmission line comprises:
a plurality of shunt-connected Josephson junctions, and
a plurality of series-connected inductors connected to the shunt-connected Josephson junctions; and
the readout circuit is connected to at least three nodes of the discrete element transmission line, wherein a first end of the discrete element transmission line is terminated by a resistance.

\* \* \* \* \*